United States Patent
Jang

[11] Patent Number: 5,697,865
[45] Date of Patent: Dec. 16, 1997

[54] HYDRAULIC CONTROL SYSTEM FOR AUTOMATIC TRANSMISSION OF AUTOMOTIVE VEHICLES

[75] Inventor: Jaeduk Jang, Kyungki-do, Rep. of Korea

[73] Assignee: Hyundai Motor Company, Rep. of Korea

[21] Appl. No.: 640,595

[22] Filed: May 1, 1996

[30] Foreign Application Priority Data

May 26, 1995 [KR] Rep. of Korea ............ 95 13458

[51] Int. Cl.$^6$ ............................................. F16H 61/26
[52] U.S. Cl. .................... 477/130; 477/131; 477/116; 477/143; 477/144
[58] Field of Search ................. 477/116, 117, 477/121, 130, 131, 143, 144, 154, 155

[56] References Cited

U.S. PATENT DOCUMENTS

| | | | |
|---|---|---|---|
| 4,982,622 | 1/1991 | Yamamoto et al. | 477/117 |
| 5,131,298 | 7/1992 | Marusue | 477/144 |
| 5,558,599 | 9/1996 | Tsukamoto et al. | 477/116 |
| 5,582,559 | 12/1996 | Jang et al. | 477/131 X |

*Primary Examiner*—Khoi Q. Ta
*Attorney, Agent, or Firm*—Finnegan, Henderson, Farabow, Garrett & Dunner, L.L.P.

[57] ABSTRACT

A hydraulic control system for an automatic transmission includes a hydraulic pump, a pressure regulating valve, a solenoid supply valve, a manual valve, a torque control regulator valve, a control switching valve, a N-D control valve, a 1-2 shift valve, a 2-3 shift valve, a 3-4 shift valve, and a N-R control valve. Accumulators are disposed in conduits to first and seventh friction members for reducing shift shock caused by line pressure and drive pressure fed from fourth and second clutch valves.

9 Claims, 12 Drawing Sheets

HYDRAULIC CONTROL SYSTEM FOR AUTOMATIC TRANSMISSION OF AUTOMOTIVE VEHICLES

BACKGROUND OF THE INVENTION

1. Field of the Invention

The present invention relates to a hydraulic control system for an automatic transmission of an automotive vehicle. In particular, the present invention relates to a hydraulic control system of an automatic transmission wherein shift response and shift feeling is improved, construction is simplified, and an accumulator is added to reduce shift shock when performing manual speed shifting.

2. Description of the Related Art

In a conventional automatic transmission, driving force from the engine is transmitted to a multi-stage gear shift mechanism. Friction members are used to select a gear shift stage according to the driving state of the vehicle. A hydraulic pump pressurizes fluid, and the friction members selected by control valves are actuated by the pressurized fluid.

The conventional hydraulic control system includes a pressure regulating valve for regulating pressure from the hydraulic pump, a manual means and an automatic shift control means for changing the shifting mode, a pressure control valve for controlling the shift feeling and the shift response, a damper clutch control valve for actuating a damper clutch of the torque converter, and a pressure dispensing means for feeding pressure to each of a plurality of friction members.

The pressure control valve regulates pressure fed to the friction members, torque converter and solenoid valve, and shift feeling is substantially affected by pressure. Therefore, it is preferable to feed a regulated pressure to the friction members at the beginning of the speed shifting, and to change actuating pressure for the friction members to drive pressure once the gears in the transmission are synchronized.

In a conventional hydraulic control system, the friction members are actuated by torque pressure at first, and later, by drive pressure. While this system provides improved shift feeling, manual speed shifting is not possible and the operation for controlling the shifting is complex.

SUMMARY OF THE INVENTION

Accordingly, to solve the above-mentioned problem of the conventional hydraulic control system, an object of the present invention is to provide a hydraulic control system of an automatic transmission which is simple in construction and can minimize shift shock by adding a one-way clutch to the conventional hydraulic control system.

Another object of the present invention is to provide a hydraulic control system wherein drive pressure from the manual valve is fed to actuate a seventh friction member after the shift shock is absorbed by an accumulator to improve smooth shifting when manually shifting from a fourth speed of a "D" range to a second speed of a "2" range and when manually shifting from a third speed to a first speed of the "D" range.

Additional objects and advantages will be set forth in the description which follows and in part will be obvious from the description, or may be learned by practice of the invention. The objects and advantages may be realized and attained by means of the combination particularly pointed out in the attached claims.

To accomplish the object, the present invention provides a hydraulic control system for an automatic transmission, comprising a hydraulic pump for pressurizing fluids;

a pressure regulating valve connected to the hydraulic pump for varying pressure according to vehicle driving state;

a solenoid supply valve for feeding a line pressure fed from the pressure regulating valve via a line pressure conduit to first, second and third solenoid valves;

a manual valve operated by a shift select lever for feeding pressure from the hydraulic pump to a drive pressure conduit at a "D" range and to a reverse pressure conduit at an "R" range;

a torque control regulator valve which receives torque pressure from the manual valve to convert torque pressure by the third solenoid valve controlled according to a duty ratio;

a control switching valve which receives torque pressure from the torque control regulator valve to alternately feed torque pressure to a first torque pressure conduit or a second torque pressure conduit by a fourth solenoid valve controlled to an ON/OFF state;

an N-D control valve for feeding the torque pressure first, and a drive pressure thereafter, to a second friction member actuated together with a first friction member which is actuated by line pressure at the beginning of speed shifting when changing from a neutral mode to a drive mode to prevent shift shock;

a 1-2 shift valve controlled by a fifth solenoid valve which is controlled to an ON/OFF state for feeding the torque pressure from the first and second torque pressure conduits and the drive pressure from the manual valve to a third friction member via a second clutch valve when shifting from a first speed to a second speed of the "D" range;

a 2-3 shift valve controlled by a sixth solenoid valve which is controlled to an ON/OFF state for feeding the torque pressure from the 1-2 shift valve and some fluids fed to the third friction member to a fourth friction member via a third clutch valve and for feeding the drive pressure of an "L" range from the manual valve to a sixth friction member when shifting from the second speed to a third speed of the "D" range;

a 3-4 shift valve controlled by a seventh solenoid valve which is controlled to an ON/OFF state for feeding the torque pressure from the 2-3 shift valve and a portion of the fluid fed to the fourth friction member to a fifth friction member via a fourth clutch valve, and obstructing pressure fed to the first friction member, and for feeding the drive pressure from the manual valve to a seventh friction member via the third and second clutch valves when manually shifting from the second speed of the "D" range to a second speed of a "2" range; and an N-R control valve controlled by the third solenoid valve for feeding pressure from the manual valve via the reverse pressure conduit to the sixth friction member.

In one preferred embodiment, accumulators are disposed in conduits to the first and seventh friction members for reducing shift shock caused by line pressure and drive pressure fed from the fourth and second clutch valves.

The accompanying drawings, which are incorporated in and constitute a part of this specification, illustrate a preferred embodiment of the invention and, together with the description, serve to explain the principles of the invention.

DESCRIPTION OF THE PREFERRED EMBODIMENT OF THE INVENTION

Reference will now be made in detail to the present preferred embodiment of the invention as broadly illustrated in the accompanying drawings.

Figure 1:
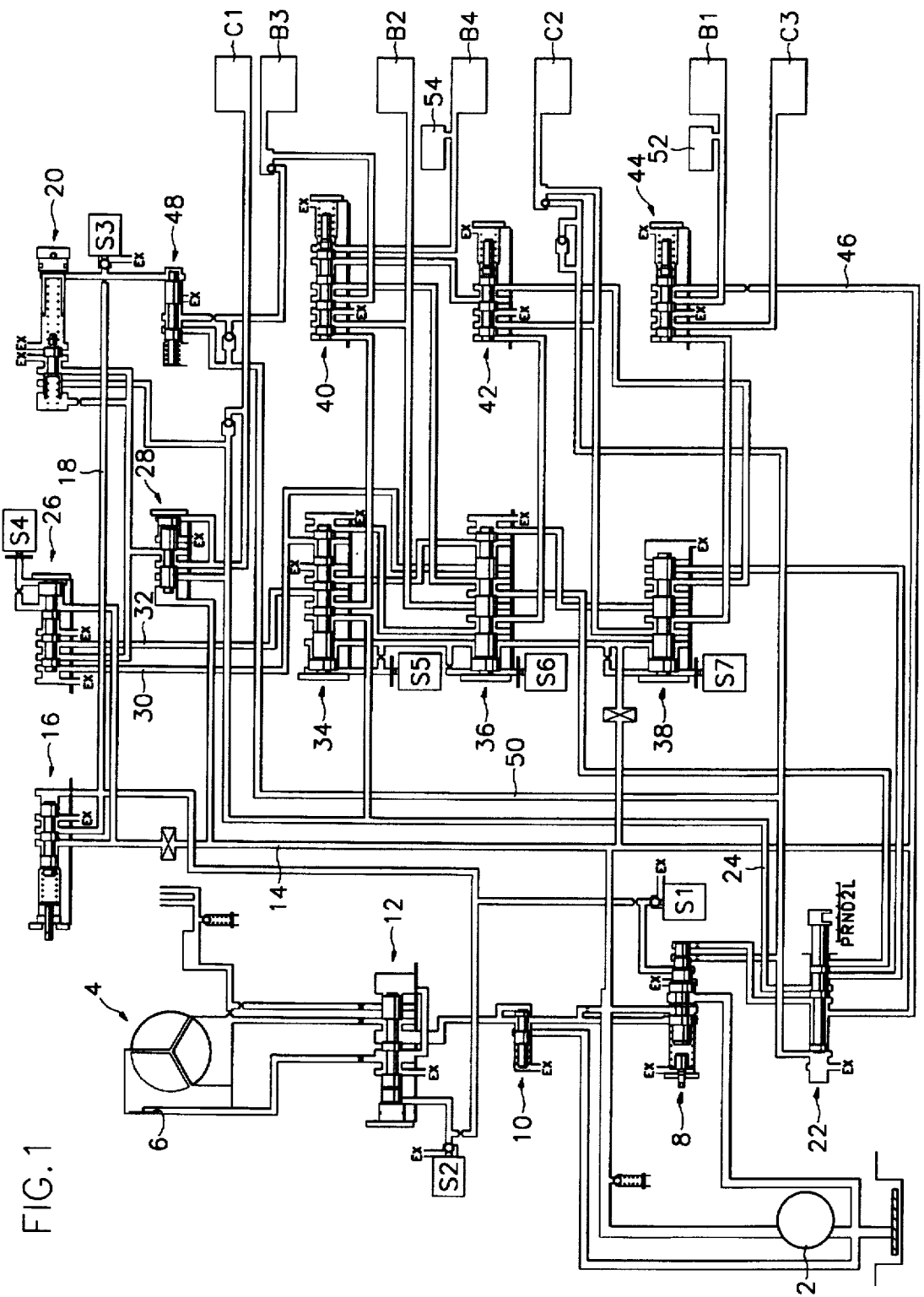
FIG. 1 is a hydraulic circuit diagram of an embodiment of a hydraulic control system according to the present invention.

As broadly embodied herein to FIG. 1, the hydraulic control system according to the present invention includes a hydraulic pump 2 for pressurizing a fluid, a torque converter 4 for transmitting engine power to the automatic transmission, a damper clutch 6 installed within the torque converter 4 to improve power transmission efficiency, a pressure regulating valve 8 for adjusting pressure from the hydraulic pump 2 according to a vehicle driving state, a converter feed valve 10 for feeding pressure passing through the pressure regulating valve 8 to an actuating conduit of the torque converter and for lubrication purposes, and a converter clutch regulating valve 12 for controlling the damper clutch.

The pressure regulating valve 8 and the converter clutch regulating valve 12 are controlled by first and second solenoid valves S1 and S2, which are controlled according to duty ratios by a transmission control unit (TCU). The pressure regulating valve 8 feeds pressure to a solenoid supply valve 16 via a line pressure conduit 14. The solenoid supply valve 16 feeds pressure fed from the hydraulic pump 2 via the conduit 14 to the first and second solenoid valves S1 and S2 and to a third solenoid valve S3 via a conduit 18.

The third solenoid valve S3 is connected to the torque control regulator valve 20. The torque control regulator valve 20 is connected, via the drive pressure conduit 24, to the manual valve 22 which receives pressure from the line pressure conduit 14 and is operated by the shift select lever. The torque control regulator valve 20 feeds torque pressure controlled by the third solenoid valve S3 to the control switch valve 26 and to the N-D control valve 28 which reduces shift shock when shifting from to the "N" range to the "D" range.

The N-D control valve 28 feeds torque pressure to the second friction member C1 which is actuated together with the first friction member B1 directly actuated by line pressure at the beginning of the shifting and, thereafter, converts pressure of the second friction member C1 into drive pressure to reduce shift shock.

The control switching valve 26 selectively feeds torque pressure fed from the torque control regulator valve 20 to the first torque pressure conduit 30 or the second torque pressure conduit 32 by a fourth solenoid valve S4 which is controlled to an ON/OFF state by the TCU.

The first and second torque pressure conduits 30 and 32 are connected to a 1-2 shift valve 34, which is controlled by a fifth solenoid valve S5. Solenoid valve S5 is controlled to an ON/OFF state when shifting from the first speed and to the second speed, feeds drive pressure from the drive pressure conduit 24 to the third friction member B2.

A 2-3 shift valve 36 is controlled by a sixth solenoid valve S6, which is controlled to ON/OFF states at the third shifting stage, and which feeds some fluid fed to the third friction member B2 to a fourth friction member C2 to perform the third speed shifting.

The 3-4 shift valve 38, controlled by a seventh solenoid valve S7, feeds some fluid fed to the fourth friction member C2 to the fifth friction member C3.

Second clutch valve 40, which receives drive pressure from the 1-2 shift valve 34 at the second speed of the "D" range, simultaneously feeds drive pressure to the third friction member B2 and the 2-3 shift valve 36. Second clutch valve 40 is connected to the third clutch valve 42, which in turn is connected to the 3-4 shift valve 38 to feed drive pressure to the sixth and seventh friction members B3 and B4.

Third clutch valve 42 receives torque pressure from the 2-3 shift valve 36, and simultaneously feeds torque pressure to the fourth friction member C2 and the 3-4 shift valve 38 to actuate the fourth friction member C2.

Fourth clutch valve 44 receives torque pressure from the 3-4 shift valve 38 to actuate the fifth friction member C3. This fourth clutch valve 44 is connected to a conduit 46 branching from the line pressure conduit 14 to actuate the first friction member B1 by line pressure at the first, second and third speeds of the "D" range.

N-R control valve 48 is controlled by the third solenoid valve S3 at the "R" range and feeds drive pressure fed from the manual valve 22 via the reverse pressure conduit 50 to the sixth friction member B3.

A first accumulator 52 for reducing shift shock is disposed in a conduit through which line pressure from the fourth clutch valve 44 is fed to the first friction member B1. Also, a second accumulator 54 is disposed in a conduit through which drive pressure from the second clutch valve 40 is fed to the seventh friction member B4.

Operation of each section of the hydraulic control system according to the present invention, as broadly embodied herein, will be explained with reference to FIGS. 2–5.

Figure 2:
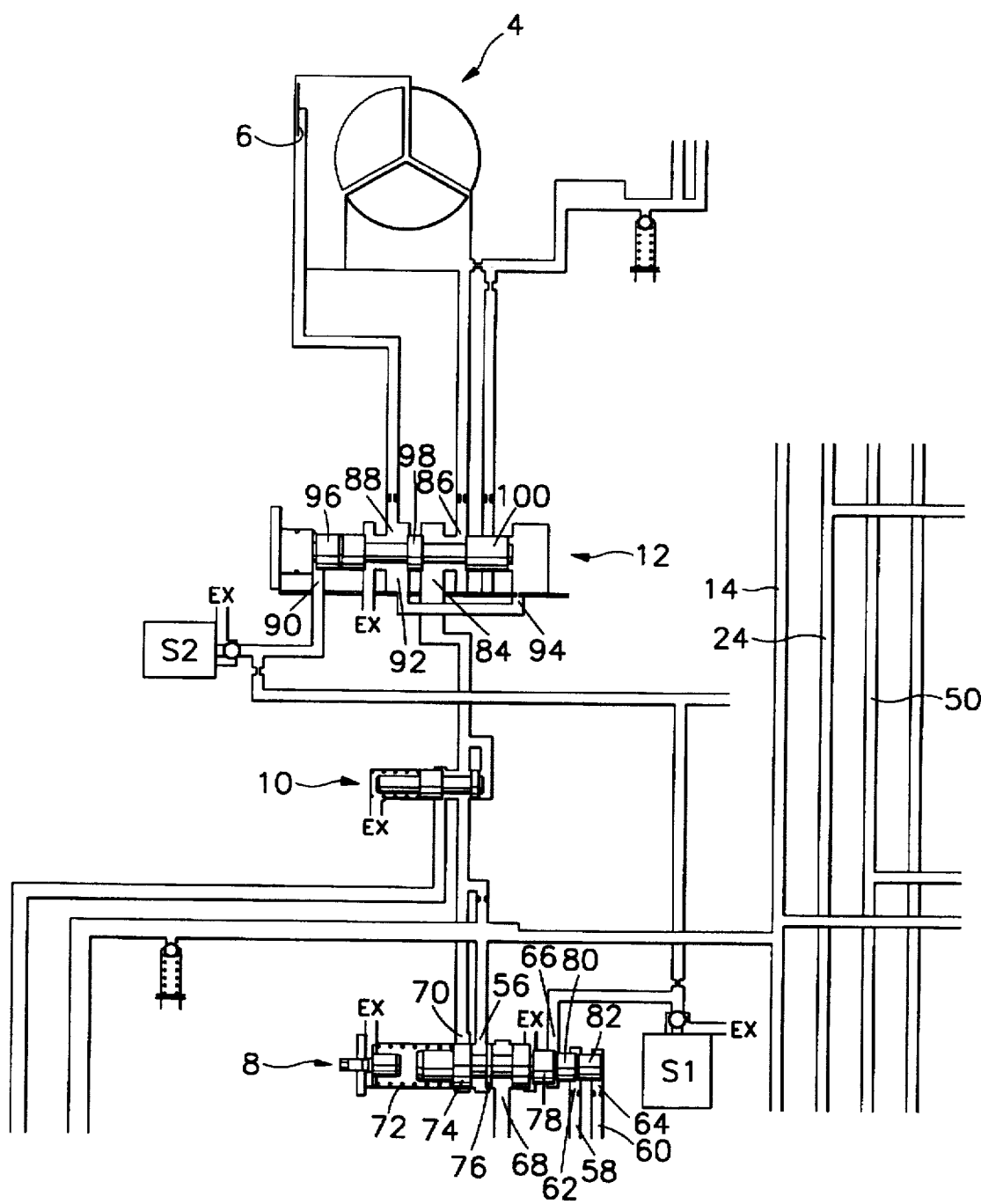
FIG. 2 is an enlarged view of the pressure control section of the system shown in FIG. 1.

Referring to the pressure control section, shown in FIG. 2, the pressure regulating valve 8 includes a first port 56 connected to the hydraulic pump 2, a second port 62 connected to the reverse pressure conduit 58 of the manual valve 22, a third port 64 connected to the main conduit 60 of the manual valve 22, a fourth port 66 to which pressure controlled by the first solenoid valve S1 is fed, a fifth port 68 for exhausting extra fluids, and a sixth port 70 for feeding pressure to the control feed valve 10.

A valve spool of the pressure regulating valve 8 is biased by a spring 72 and has a first land 74 for selectively closing the sixth port 70, a second land 76 for regulating the opening size of the fifth port 68 which is an exhaust port, a third land 78 on which pressure coming through the fourth port 66 acts, a fourth land 80 on which pressure coming through the second port 62, acts and a fifth land 82 on which pressure coming through the third port 64 acts.

Pressure from the sixth port 62 of the pressure regulating valve 8 is fed to the converter feed valve 10 which is connected to the converter clutch regulating valve 12. This converter clutch regulating valve 12 actuates or releases the damper clutch 6 of the torque converter 4 and, controlled by the second solenoid valve S2, feeds oil to the transmission for lubrication purposes.

The converter clutch regulating valve 12 has a first port 84 through which pressure is fed, a second port 86 through which pressure for actuating the damper clutch 6 is fed, a third port 88 through which pressure for releasing the damper clutch 6 is fed, a fourth port 90 to which pressure from the second solenoid valve S2 is fed, and fifth and sixth ports 92 and 94 through which pressure acting against pressure coming through the fourth port 90 is fed.

A valve spool of this converter clutch regulating valve 12 includes a first land 96 on which pressure coming through the fourth port 90 acts, a second land 98 for selectively connecting the first port 84 with the second port 86 or the third port 88, and a third land 100 on which pressure coming through the sixth port 94 acts.

Figure 3:
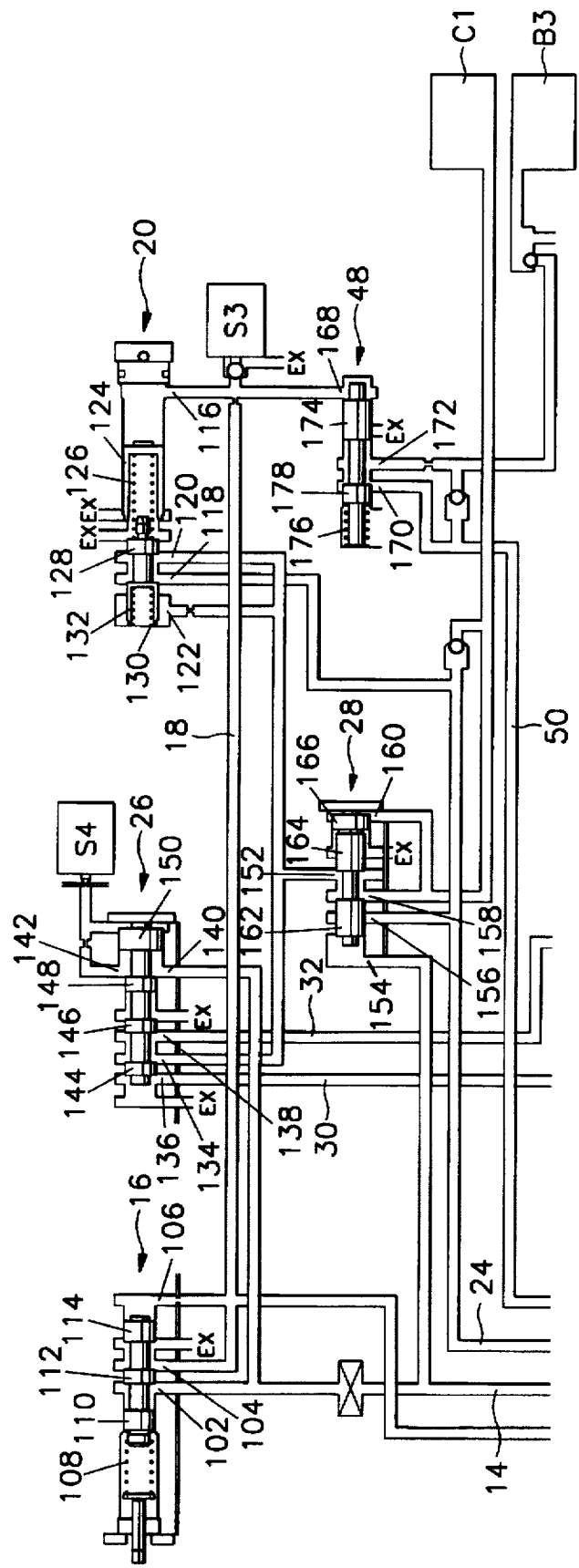
FIG. 3 is an enlarged view of the torque pressure converting and feeding section of the system shown in FIG. 1.

Referring to the torque pressure converting and feeding section, shown in FIG. 3, the solenoid supply valve 16 for feeding line pressure fed from the pressure regulating valve 8 through the line pressure conduit 14 to the first, second and third solenoid valves S1, S2 and S3 has a first port 102 connected to the line pressure conduit 14, a second port 104 for feeding pressure coming through the first port 102 to the conduit 18, and a third port 106 to which pressure from the second port 104 is fed to displace a valve spool of the solenoid supply valve 16. The valve spool of the solenoid supply valve 16 has a first land 110 biased by a spring 108, a second land 112 for changing the opening size of the second port 104, and a third land 114 on which pressure coming through the third port 106 acts.

The torque control regulator valve 20 is controlled by the third solenoid valve S3 which is controlled to an ON/OFF state and has a first port 116 to which control pressure is fed, a second port 118 to which drive pressure from the manual valve 22 is fed along the drive pressure conduit 24, and third and fourth ports 120 and 122 to which drive pressure coming through the second port 118 is selectively fed.

A valve spool of the torque control regulator valve 20 has a first plug 124 which is displaced by line pressure coming through the first port 116, a spring 126 biasing the plug 124, a land 128 biased at the other end of the spring 126, and a second plug 132 biased by another spring 130.

The control switching valve 26 to which torque pressure from the second and third ports 118 and 120 of the torque control regulator valve 20 is selectively fed has a first port 134 to which torque pressure from the third port 120 of the torque control regulator valve 20 is fed, a second port 136 through which pressure coming through the first port 134 is fed to the conduit 30, a third port 138 through which pressure coming through the first port 134 is fed to the conduit 32, a fourth port 140 to which line pressure from the line pressure conduit 14 is directly fed, and a fifth port 142 connected to the fourth solenoid valve S4 which feeds pressure to the fifth port 142 in an opposite direction to that coming through the fourth port 140. A valve spool of the control switching valve 26 has a first land 144 for closing the first and second ports 134 and 136, a second land 146 for closing the first and third ports 134 and 138, a third land 148 on which line pressure coming through the fourth port 140 acts, and a fifth port 142 on which line pressure coming through the fifth port 142 acts.

The N-D control valve 28, which receives torque pressure from the torque control regulator valve 20 and reduces shift shock when shifting from the neutral range to the driving range has a first port 152 to which torque pressure is fed, a second port 154 to which line pressure is fed, a third port 156 to which drive pressure is fed, a fourth port 158 through which drive pressure coming through the third port 156 is fed to the second friction member C1, and a fifth port 160 through which pressure from the fourth port 158 is fed to convert ports.

A valve spool of the N-D control valve 28 has a first land 162 on which line pressure coming through the second port 154 acts, a second land 164 for obstructing torque pressure coming through the first port 144, and a third land 166 on which drive pressure coming through the fifth port 152 acts.

The N-R control valve 48, which is actuated at the reverse range to feed pressure to the sixth friction member B3, has a first port 168 through which control pressure from the third solenoid valve S3 is fed, a second port 170 to which reverse pressure from a manual valve 22 is fed along the reverse pressure conduit 50, and a third port 172 through which reverse pressure fed to the second port 170 is fed to the sixth friction member B3.

A valve spool of the N-R control valve 48 has a first land 174 on which control pressure coming through the first port 168 acts, and a second land 178 biased by a spring 176 to close the second port 170.

Figure 4:
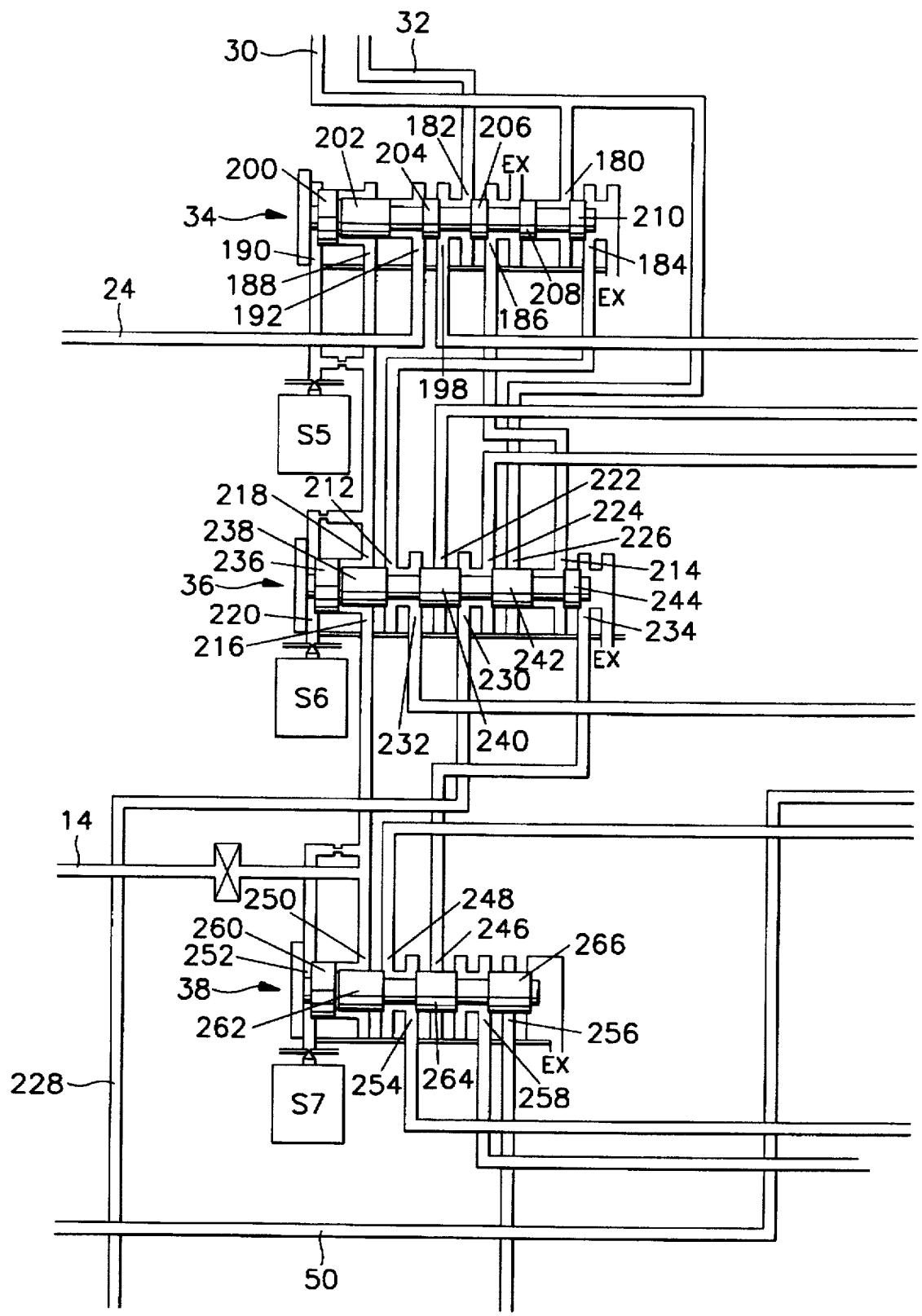
FIG. 4 is an enlarged view of the shift valves in the system shown in FIG. 1.

Referring to the shift valves shown in FIG. 4, the 1-2 shift valve 34, which feeds actuating pressure to the third friction member B2 when shifting from the first speed to the second speed of the "D" range, has a first port 180 to which torque pressure from the first torque pressure conduit 30 is fed, a second port 182 to which torque pressure from the second torque pressure conduit 32 is fed, a third port 184 through which torque pressure coming through the first port 180 is fed to one of the ports of the 2-3 shift valve 36, and a fourth port 186 through which pressure coming through the second port 182 is fed to another port of the 2-3 shift valve 36, a fifth port 188 to which line pressure is fed through the 2-3 shift valve 36 connected to the line pressure conduit 14, a sixth port 190 to which line pressure is fed according to the fifth solenoid valve S5 controlled to an ON/OFF state, a seventh port 192 to which drive pressure from the drive pressure conduit 24 is fed, and an eighth port 198 through which pressure coming through the seventh port 192 is fed to the second clutch valve 40.

A valve spool of the 1-2 shift valve 34 has a first land on both sides on which line pressure coming through the fifth and sixth ports 188 and 190 acts, a second land 202 on which line pressure coming through the seventh port 192 acts, a third land 204 which closes the communication between the seventh port 192 and the eighth port 198, a fourth land 206 which opens the communication between the seventh port 192 and the eighth port 198, a fifth land 208 on which torque pressure coming through the first port 180 acts, and a sixth port 210 on which torque pressure acts when torque pressure is fed from the first port 18 to the third port 184.

The 2-3 shift valve 36, through which drive pressure is fed to the fourth friction member C2 when shifting from the second speed, to the third speed has a first port 212 connected to the third port 184 of the 1-2 shift valve 34 to receive first torque pressure, a second port 214 connected to the fourth port 186 of the 1-2 shift valve 34 to receive the second torque pressure, a third port 216 to which line pressure from the line pressure conduit 14 is fed, a fourth port 218 through which line pressure from the third port 216 is fed to the fifth and sixth ports 188 and 190 of the 1-2 shift valve 34, a fifth port 220 to which line pressure coming through the fourth port 218 and controlled by the sixth solenoid S6 is fed, a sixth port 222 to which second torque pressure coming through the third friction member B2 is fed, a seventh port 224 connected to one of the ports of the second clutch valve 40, an eighth port 226 directly connected to the first torque pressure conduit 30, a ninth port 230 connected to the conduit 228 to which drive pressure is fed at the "L" range state, a tenth port 232 through which torque pressure coming through the sixth port 222 is fed to the third clutch valve 42, and an eleventh port 234 through which torque pressure coming through the second port 214 is fed to one of the ports of the 3-4 shift valve 38.

A valve spool of the 2-3 shift valve 36 has a first land 236, on both sides of which line pressure from the third port 216 and the fifth port 220 acts, a second land 238 on which torque pressure from the first port 212 acts, a third land 240 which selectively allows the sixth port 222 to be connected to the tenth port 232, a fourth land 242 which selectively allows the seventh port 224 to be connected to the ninth port 230, and a fifth land 244 which selectively allows the second port 214 to be connected to the eleventh port 234.

The 3-4 shift valve 38, which releases the first friction member B1 when shifting from the third speed to the fourth speed and feeds torque pressure to actuate the fifth friction member C3, has a first port 246 to which torque pressure from the eleventh port 234 of the 2-3 shift valve 36 is fed, a second port 248 to which torque pressure fed to the fourth friction member C2 is fed, a third port 250 to which line pressure from the line pressure conduit 14 is fed, a fourth port 252 to which line pressure controlled by the seventh solenoid valve S7 is fed, a fifth port 254 through which torque pressure coming through the first port 246 is fed to the fifth friction member C3 via the fourth clutch valve 44, a sixth port 256 to which drive pressure from the manual valve 22 is fed at the "2" and "L" ranges, and a seventh port 258 through which drive pressure fed to the sixth port 256 is fed to the seventh friction member B4 via the third clutch valve 42 and the second clutch valve 40.

A valve spool of the 3-4 shift valve 38 has a first land on both sides of which line pressure coming through the third port 250 and the fourth port 252 acts, a second land 262 on which torque pressure coming through the second port 248 acts, a third land 264 which selectively allows the first port 246 to be connected to the fifth port 254, and a fourth land 266 which selectively allows the sixth port 256 to be connected to the seventh port 258.

Figure 5:
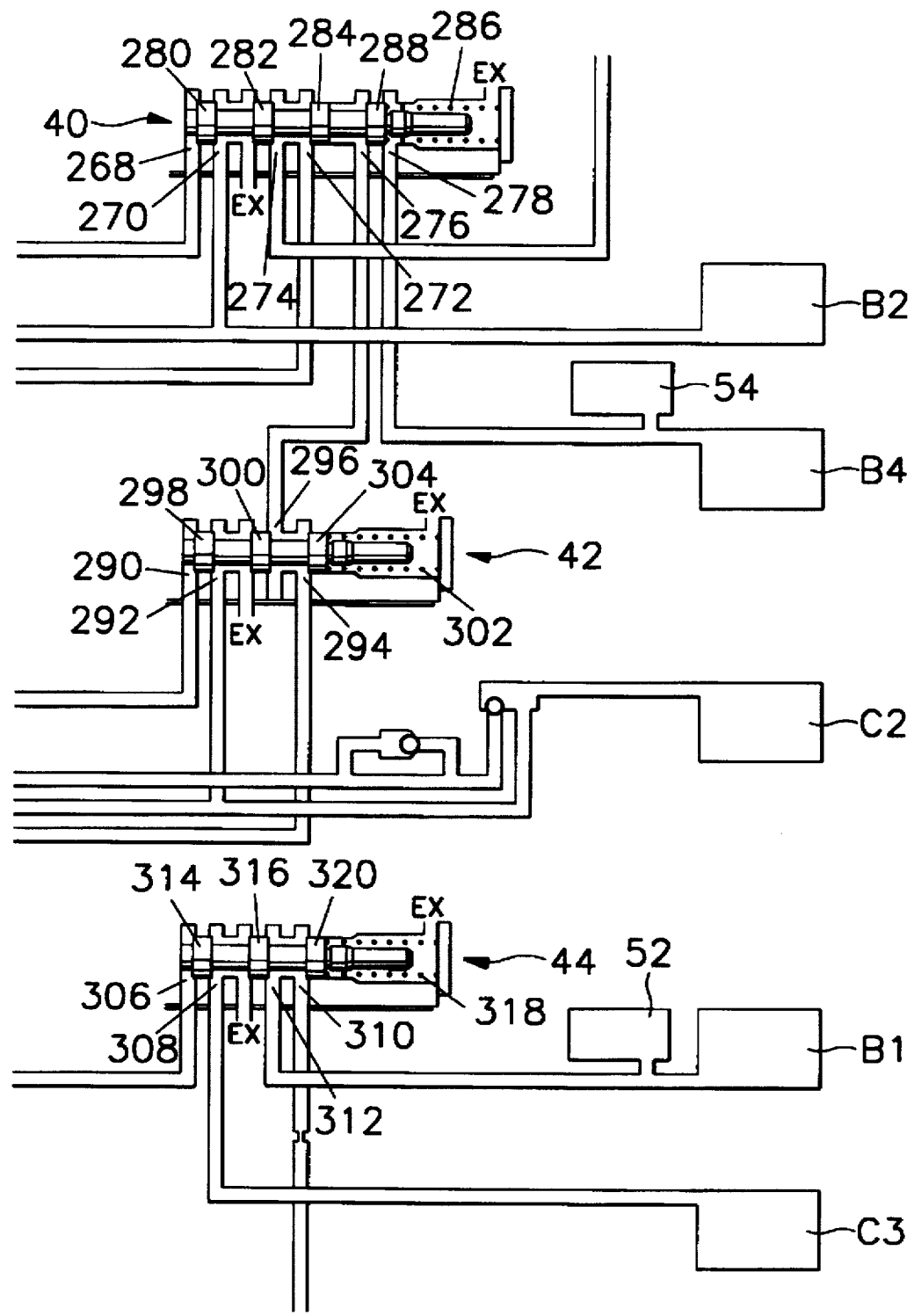
FIG. 5 is an enlarged view of the clutches and the brake valves in the system shown in FIG. 1.

Referring to FIG. 5, the second clutch valve 40 to which drive pressure from the 1-2 shift valve 34 is fed has a first port 268 to which drive pressure is fed from the 1-2 shift valve 34, a second port 270 through which drive pressure coming through the first port 268 is fed to the third friction member B2 and the 2-3 shift valve 36, a third port 272 to which pressure from the seventh port 224 of the 2-3 shift valve 36 is fed, a fourth port 274 through which pressure coming through the third port 272 is fed to the sixth friction member B3, a fifth port 276 connected to a port of the third clutch valve 42 at the "2" and "L" ranges to receive drive pressure, and sixth port 278 through which drive pressure coming through the fifth port 276 is fed to the seventh friction member B4.

The second accumulator 54 for absorbing shift shock when drive pressure acts on the seventh friction member B4 is disposed in the drive pressure conduit through which drive pressure from the sixth port 278 is fed to the seventh friction member B4.

A valve spool of the second clutch valve 40 has a first land 280 which selectively allows the first port 268 to be connected to the second port 270, a second land 282 which selectively allows the third port 272 to be connected to the fourth port 274, a third land 284 which separates the third port 272 from the fifth port 276, and a fourth land 288 which is biased by a spring 286 and selectively allows the fifth port 276 to be connected to the sixth port 278.

The third clutch valve 42, which receives torque pressure from the 2-3 shift valve 36 and feeds torque pressure to the fourth friction member C2, has a first port 290 to which torque pressure from the 2-3 shift valve 36 is fed, a second port 292 through which torque pressure coming through the first port 290 is fed to the fourth friction member C2 and the 3-4 shift valve 38, a third port 294 to which drive pressure from the manual valve 22 is fed via the seventh port 258 of the 3-4 shift valve 38 at the "2" and "L" ranges, and a fourth port 296 through which drive pressure coming through the third port 294 is fed to the fifth port 276 of the second clutch valve 40.

A valve spool of the third clutch valve 42 has a first land 298 which selectively allows the first port 290 to be connected to the second port 292, a second land 300 which selectively allows the third port 294 to be connected to the fourth port 296, and a third land 304 biased by a spring 302.

The fourth clutch valve 44, which allows line pressure fed to the first friction member B1 at the first, second and third speeds of the "D" range and allows torque pressure fed to the fifth friction member C3 at the fourth speed, has a first port 306 to which torque pressure from the 3-4 shift valve 38 is fed, a second port 308 through which torque pressure coming through the first port 306 is fed to the fifth friction member C3, a third port 310 to which line pressure from the line pressure conduit 46 is fed, and a fourth port 312 through which line pressure coming through the third port 310 is fed to the first friction member B1.

A valve spool of the fourth clutch valve 44 has a first land 314 which selectively allows the first port 306 to be connected to the second port 308, a second land 316 which selectively allows the third port 310 to be connected to the fourth port 312, and a third land 320 which is biased by a spring 318.

The first accumulator 52 is disposed in a conduit connecting the fourth port 312 with the first friction member B1.

Figure 6:
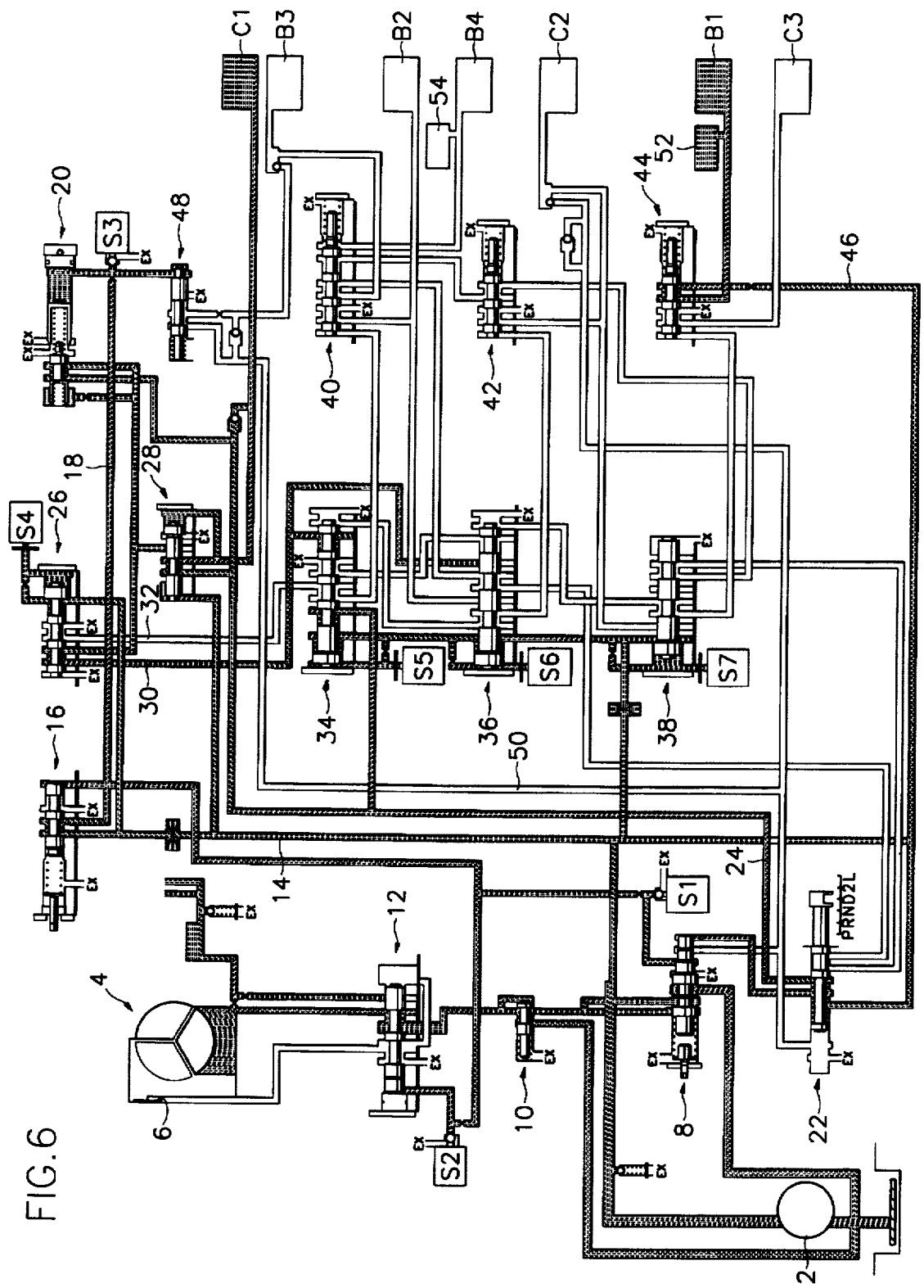
FIG. 6 is the hydraulic circuit diagram of FIG. 1 showing the operation of the control system during a first speed of a "D" range.

Referring to FIG. 6, as the engine of the vehicle is operated, the first solenoid valve S1 controls pressure fed to the fourth port 66 of the pressure regulating valve 8. As this allows pressure acting on the third land 78 to vary, the fifth port 68 is connected to the first port 56 to exhaust or obstruct pressure generated at the hydraulic pump 2.

Regulated line pressure thus is fed to the first port 102 of the solenoid supply valve 16, and line pressure coming through the first port 102 flows out through the second port 104.

Some fluid flowing out through the second port 104 is fed to the third port 106 and acts on a right side face of the third land 114 to displace the valve spool of the solenoid supply valve 16 towards the left in the figure. As the second port 104 is partly closed by the second land 112, pressure fed to the third port 106 via the second port 104 is decreased and the valve spool is displaced towards the right again by the spring 108. As these operations are repeated, pressure flowing out through the second port 104 is fed to the first port 116 of the torque control regulator valve 20. Because pressure fed through this first port 116 is increased or decreased according to the third solenoid valve S3 controlled to an ON/OFF state, displacement of the first plug 124 is controlled.

As the third solenoid valve S3 is controlled to an OFF state and the first plug 124 is displaced towards the left in the figure to compress the spring 126, the land 128 biased by the spring 126 also is displaced towards the left.

As the shifting mode is changed from the "N" range to the "D" range in this state, some fluid from the line pressure conduit 14 is fed to the first friction member B1 through the fourth clutch valve 44 whose valve spool is displaced towards the left to allow the third port 310 to be connected to the fourth port 312 and actuate the first friction member B1.

At same time, drive pressure flowing through the drive pressure conduit 24 via the manual valve 22 is fed to the first port 116 of the torque control regulator valve 20.

As a result of the above operation, the land 128 and the second plug 132 are displaced towards the left, and the second port 118 and the third port 120 are communicated with each other such that pressure coming through the second port 118 flows out through the third port 120. Pressure from the third port 120 is fed to the first port 120 of the control switching valve 26 and the first port 152 of the N-D control valve 28.

Some fluid from the line pressure conduit 14 is fed to the second port 154 of the N-D control valve 28 to displace the valve spool towards the right and allow the first port 152 and the fourth port 158 to be connected to each other.

Torque pressure fed from the torque control regulator valve 20 to the first port 152 flows out through the fourth port 158 and is fed to the second friction member C1.

That is, as torque pressure actuates the second friction member C1, some fluid flowing out through the fourth port 158 of the N-D control valve 28 is fed to the fifth port 160 and acts on the right side face of the third land 166 to displace the valve spool towards the left in the figure.

As a result of this operation, the third port 156 and the fourth port 158 of the N-D control valve 28 are connected to each other to feed drive pressure coming through the third port 156 from the manual valve 22 to the second friction member C1.

Thus, speed shifting to the first speed is accomplished as the first and second friction member B1 and C1 are actuated.

Figure 7:
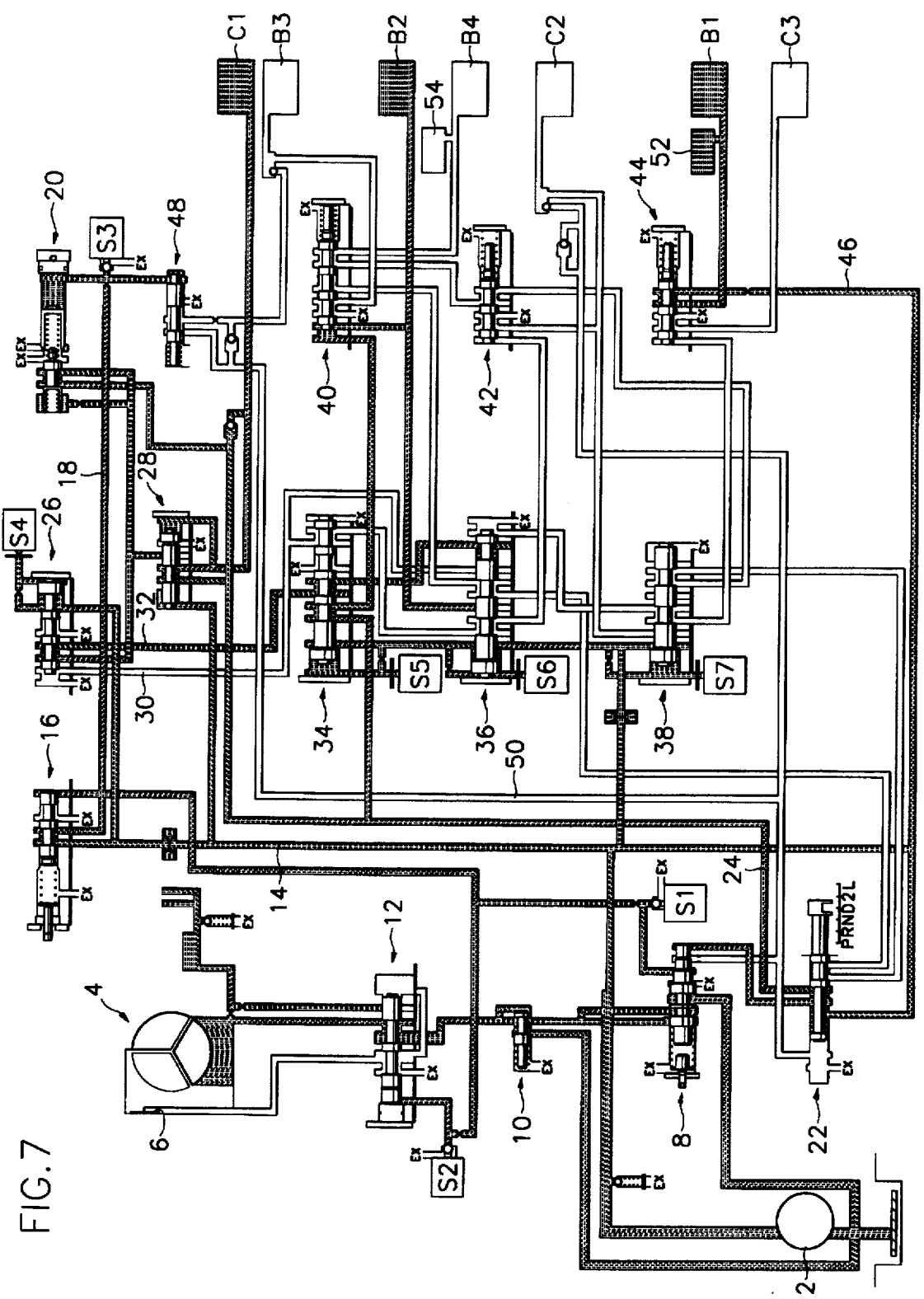
FIG. 7 is the hydraulic circuit diagram of FIG. 1 showing the operation of the control system during a second speed of the "D" range.

Referring to FIG. 7, as the vehicle speed and the throttle valve opening are increased in the first speed, the fourth solenoid valve S4 is controlled to an ON state to displace the valve spool of the control switching valve 26 towards the right in the figure.

Torque pressure fed to the first port 134 is fed to the second port 182 of the 1-2 shift valve 34 via the third port 138 along the second torque pressure conduit 32.

Because the valve spool of the 1-2 shift valve 34 is kept displaced towards the left as shown in FIG. 6, torque pressure coming through the second port 182 is fed to the first port 268 of the second clutch valve 40 via the eighth port 198.

Then, as torque pressure acts on the first land 280 of the second clutch valve 40, the valve spool overcomes the force exerted by the spring 286, is displaced towards the right in the figure, and allows the first port 268 to be connected to the second port 270. Torque pressure coming through the first port 268 is fed to the third friction member B2 through the second port 270, thus beginning a speed shift from the first speed to the second speed.

In this state, the valve spool of the 1-2 shift valve 34 is displaced towards the right according to the fifth solenoid valve S5 controlled to an OFF state. Thus, the seventh port 192 and the eighth port 198 are connected to each other, and drive pressure coming through the seventh port 192 is fed through the eighth port 198.

The third friction member B2 controlled by torque pressure at the beginning of the speed shift is actuated by drive pressure to accomplish the shift to the second speed.

Figure 8:
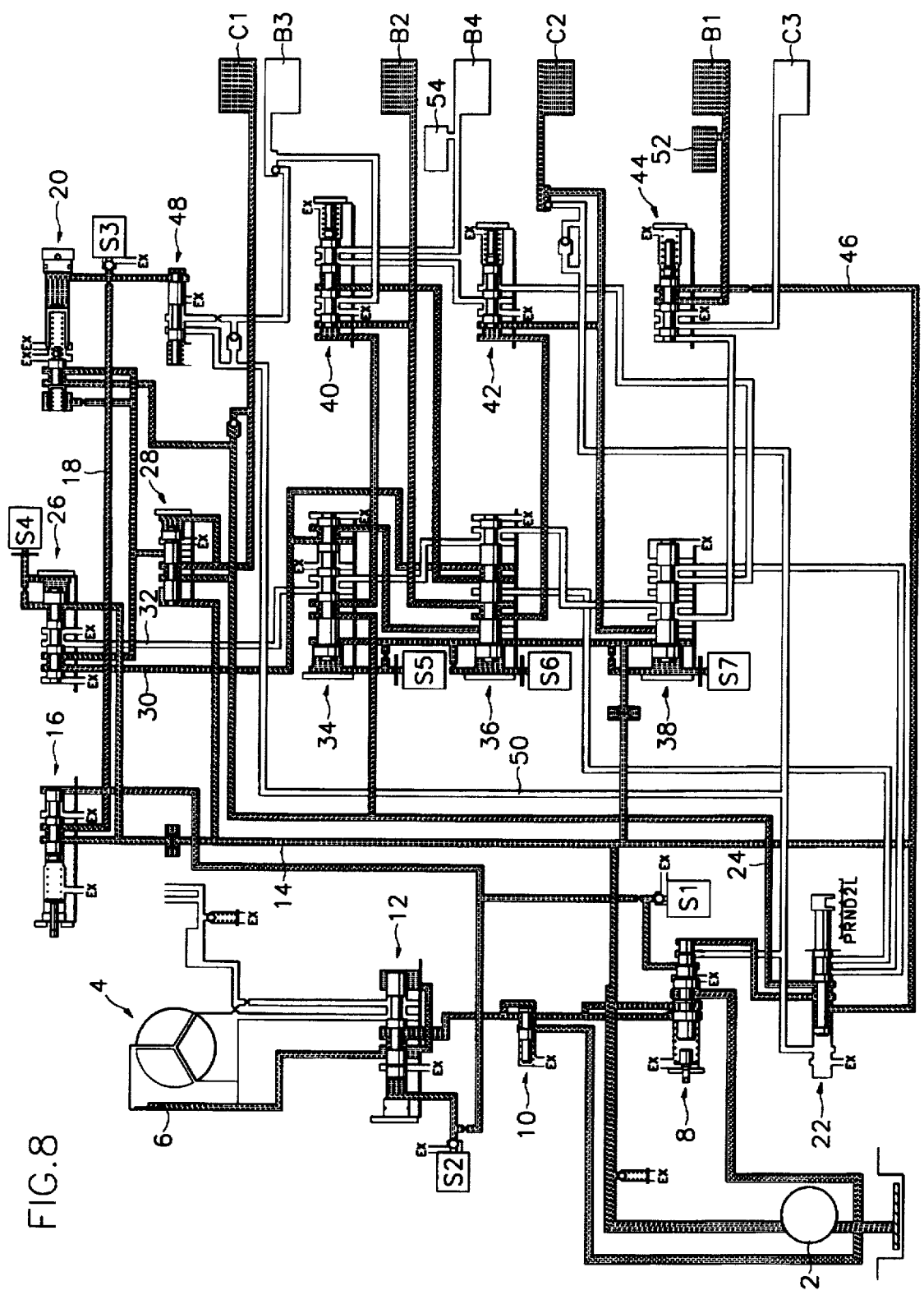
FIG. 8 is the hydraulic circuit diagram of FIG. 1 showing the operation of the control system during a third speed of the "D" range.

Referring to FIG. 8, as the vehicle speed and the throttle valve opening are increased in the second speed, with the first, second and third friction members B1, C1 and B2 kept actuated, the fourth solenoid valve S4 is controlled to an OFF state to displace the valve spool of the control switching valve 26 towards the right in the figure.

Torque pressure fed to the first port 134 is fed to the first port 180 of the 1-2 shift valve 34 via the second port 136 along the first torque pressure conduit 30.

Because the valve spool of the 1-2 shift valve 34 is kept displaced towards the right as shown in FIG. 7, torque pressure coming through the first port 180 is fed to the first port 212 of the 2-3 shift valve 36 via the third port 184.

Because the valve spool of the 2-3 shift valve 36 is kept displaced towards the left as shown in FIG. 7 and the first port 212 and the tenth port 232 are connected to each other, torque pressure coming through the first port 212 is fed to the first port 290 of the third clutch valve 42 via the tenth port 232.

Then, as torque pressure acts on the first land 298 of the third clutch valve 42, the valve spool overcomes the force exerted by the spring 302, is displaced towards the right in the figure, and allows the first port 290 to be connected to the second port 292. Torque pressure coming through the first port 290 is fed to the fourth friction member C2 through the second port 292, thus beginning a speed shift from the second speed to the third speed.

In this state, the valve spool of the 2-3 shift valve 36 is displaced towards the right according to the sixth solenoid valve S6 controlled to an OFF state to allow the sixth port 222 to be connected to the tenth port 232. Thus, torque pressure coming through the first port 212 is obstructed and drive pressure coming through the sixth port 222 is fed through the tenth port 232 to actuate the fourth friction member C2 by drive pressure.

The fourth friction member C2 controlled by torque pressure at the beginning of the speed shift is actuated by drive pressure to maintain the third speed.

Figure 9:
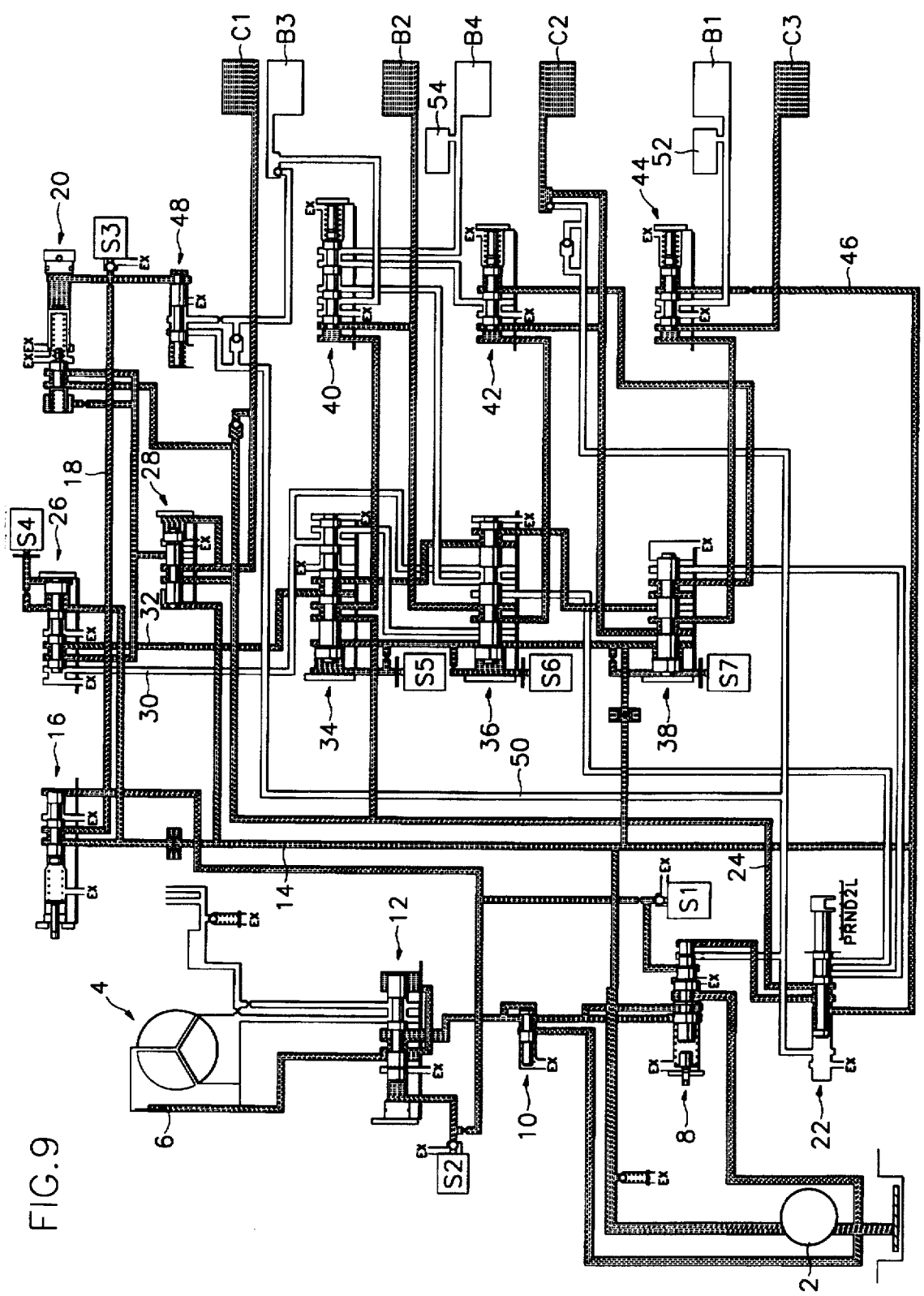
FIG. 9 is the hydraulic circuit diagram of FIG. 1 showing the operation of the control system during a fourth speed of the "D" range.

Referring to FIG. 9, as the vehicle speed and the throttle valve opening are increased in the third speed, with the first, second, third and fourth friction members B1, C1, B2 and C2 kept actuated, the fourth solenoid valve S4 is controlled to an ON state to displace the valve spool of the control switching valve 26 towards the right in the figure.

Torque pressure fed to the first port 134 is fed to the first port 182 of the 1-2 shift valve 34 via the third port 138 of the control switching valve 26 along the second torque pressure conduit 32. Torque pressure fed to the 1-2 shift valve 34 is fed to the first port 246 of the 3-4 shift valve 38 through the fourth port 186 of the 1-2 shift valve 34 and the second and eleventh ports 214 and 234 of the 2-3 shift valve 36.

Because the valve spool of the 2-3 shift valve 38 is kept displaced towards the right by the seventh solenoid valve S7 controlled to an OFF state as shown in FIG. 8, torque pressure is fed to the first port 306 of the fourth clutch valve 44 via the fifth port 254 and acts on the first land 314.

Then, the valve spool of the fourth clutch valve 44 overcomes the force exerted by the spring 318 and is displaced towards the right in the figure to separate the third port 310 from the fourth port 312, obstructing line pressure fed to the first friction member B1, and allowing the first port 306 to be connected to the second port 308. Torque pressure coming through the first port 306 is fed to the fifth friction member C3 through the second port 308, thus beginning a speed shift from the third speed to the fourth speed.

In this state, the valve spool of the 3-4 shift valve 38 is displaced towards the left according to the seventh solenoid valve S7 controlled to an ON state to allow the second port 248 to be connected to the fifth port 254. Thus, torque pressure coming through the first port 246 is obstructed and drive pressure coming through the second port 248 is fed through the fifth port 254 to actuate the fifth friction member C3 by drive pressure.

The fifth friction member C3 controlled by torque pressure at the beginning of the speed shift is actuated to perform the shift to the fourth speed and, thereafter, actuated by drive pressure to maintain the fourth speed.

The shifts to the first, second, third, and fourth speed in the "D" range, as described above, are performed when the over-drive is in an ON state. If the over-drive is in an OFF state, the shift process is performed in the same manner as when the over-drive is in an ON state, but shifting is limited to the third speed, which is the final shifting stage.

Figure 10:
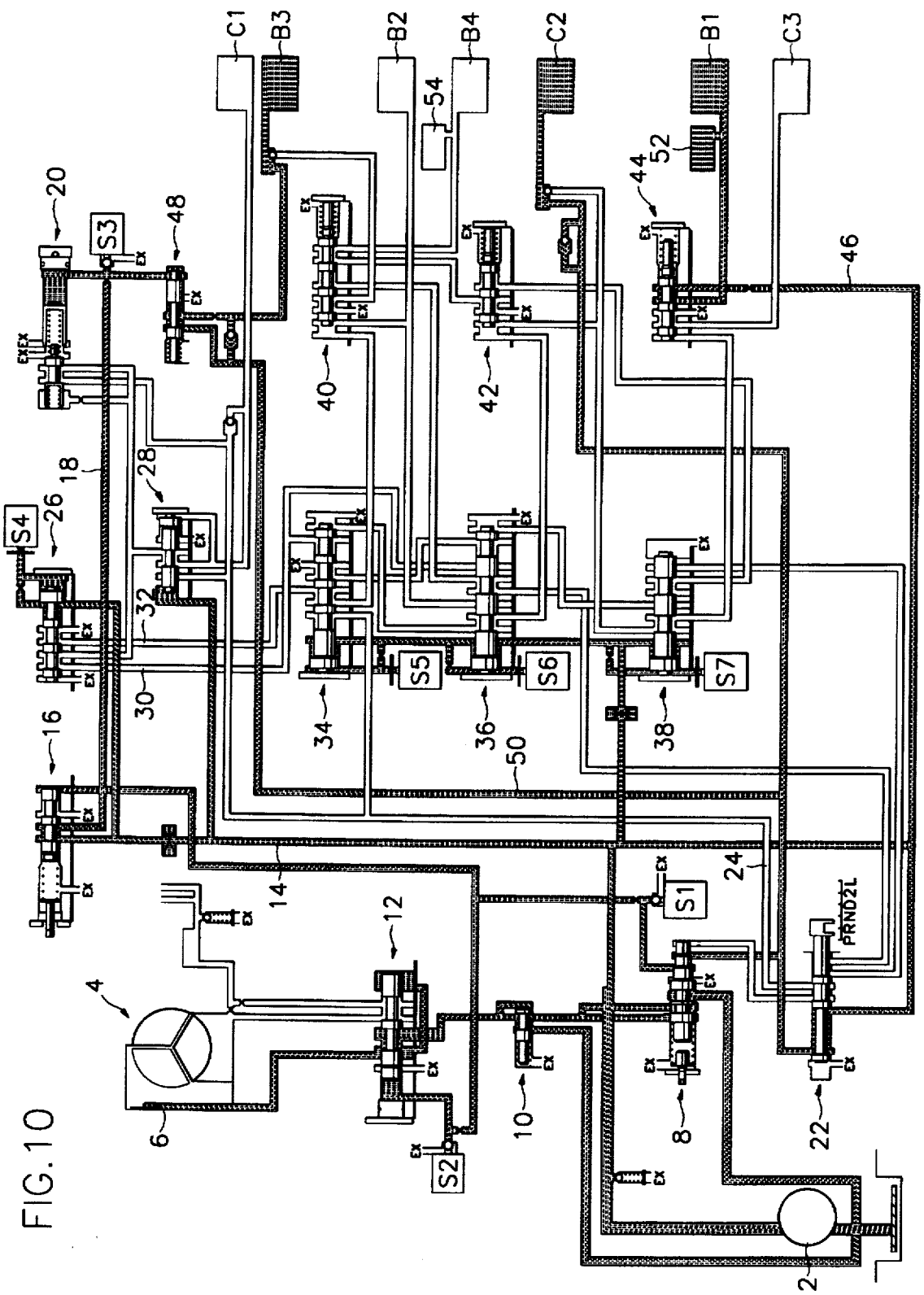
FIG. 10 is the hydraulic circuit diagram of FIG. 1 showing the operation of the control system during an "R" range.

Referring to FIG. 10, when the shifting mode is changed to the reverse range, drive pressure from the manual valve 22 is fed to the second and third ports 170 and 172 of the N-R Control valve 48, to the sixth friction member B3 which is a reverse friction member, and to the fourth friction member C2. At the same time, some fluid from the line pressure conduit 14 is fed to the first friction member B1 via the sixth and seventh ports 356 and 258 of the fourth clutch valve 44.

Even though pressure is fed to the first and second ports 168 and 170 of the N-R control valve 48 in this state, because the third solenoid valve S3 is controlled to an OFF state, the valve spool of the N-R control valve 48 is displaced towards the left in the figure to allow the second port 170 to be connected to the third port 172 and feed reverse pressure to the sixth friction member B3.

As a result of these operations, the first, fourth and sixth friction members B1, C2 and B3 are actuated to perform speed shifting to the reverse range.

Skip down-shifting can be performed from the third speed to the first speed and from the fourth speed to the second speed while driving in the "D" range. This skip shifting is performed by controlling each solenoid valve from the third speed to the first speed and from the fourth speed to the second speed.

Figure 11:
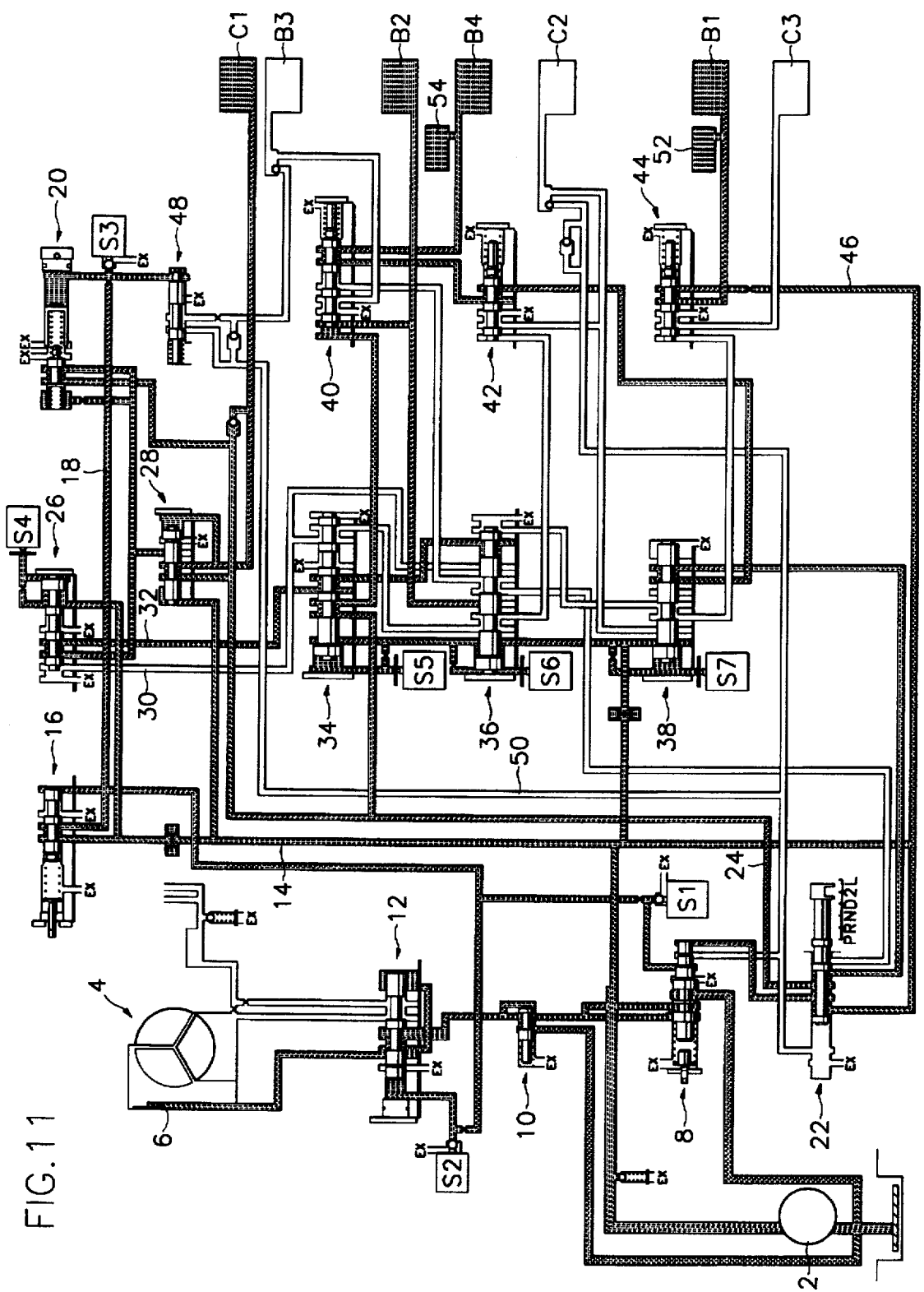
FIG. 11 is the hydraulic circuit diagram of FIG. 1 showing the operation of the control system when shifting from a fourth speed of the "D" range to a second speed of "2" range.

FIG. 11 depicts operation of the control system when manually shifting from the fourth speed of the "D" range to the second speed of the "2" range. Driving in fourth speed is performed as the second, third, fourth and fifth friction members C1, B2, C2 and C3 are actuated. As the shift select lever is operated to select the "2" range, the fourth solenoid valve S4 is controlled from an ON state to an OFF state to feed torque pressure, which is fed from the torque control regulator valve 20, to the control switching valve 26 to the first torque pressure conduit 30 via the third port 138 of the control switching valve 26, and to feed torque pressure to the second port 214 of the 2-3 shift valve 36 via the 1-2 shift valve 34.

As the sixth solenoid valve S6 is controlled to an ON state, drive pressure fed to the fourth and fifth friction members C2 and C3 is obstructed, and this drive pressure is reduced by the third solenoid valve S3. Thus, the valve spool of the fourth clutch valve 44 is displaced towards the left in the figure. The first accumulator 52 absorbs the shock of the line pressure which is fed to the first friction member B1 and actuates the first friction member B1.

The fourth solenoid valve S4 is controlled from an ON state to an OFF state, the sixth solenoid valve S6 is controlled from an OFF state to the ON state, and the third solenoid valve S3 is actuated. After drive pressure fed to the third port 212 of the 2-3 shift valve 36 is released, the seventh solenoid valve S7 is controlled from an ON state to an OFF state to displace the valve spool of the 3-4 shift valve 38 towards the right in the figure. Then, drive pressure fed from the manual valve 22 flows through the sixth and seventh ports 256 and 258 of the 3-4 shift valve 38, and the second and third clutch valves 40 and 42, to actuate the seventh friction member B4 and complete the shift to the second speed.

Here, shift shock in the drive pressure is reduced by the second accumulator 54 disposed in the conduit of the seventh friction member B4.

Also, this drive pressure is controlled to a minimum value according to the first solenoid valve S1, which is variably controlled such that shift shock when actuating the seventh friction member B4 may be minimized. That is, the second accumulator 54 disposed in the drive pressure conduit through which pressure is fed to the seventh friction member B4 mechanically absorbs shift shock when drive pressure acts.

Figure 12:
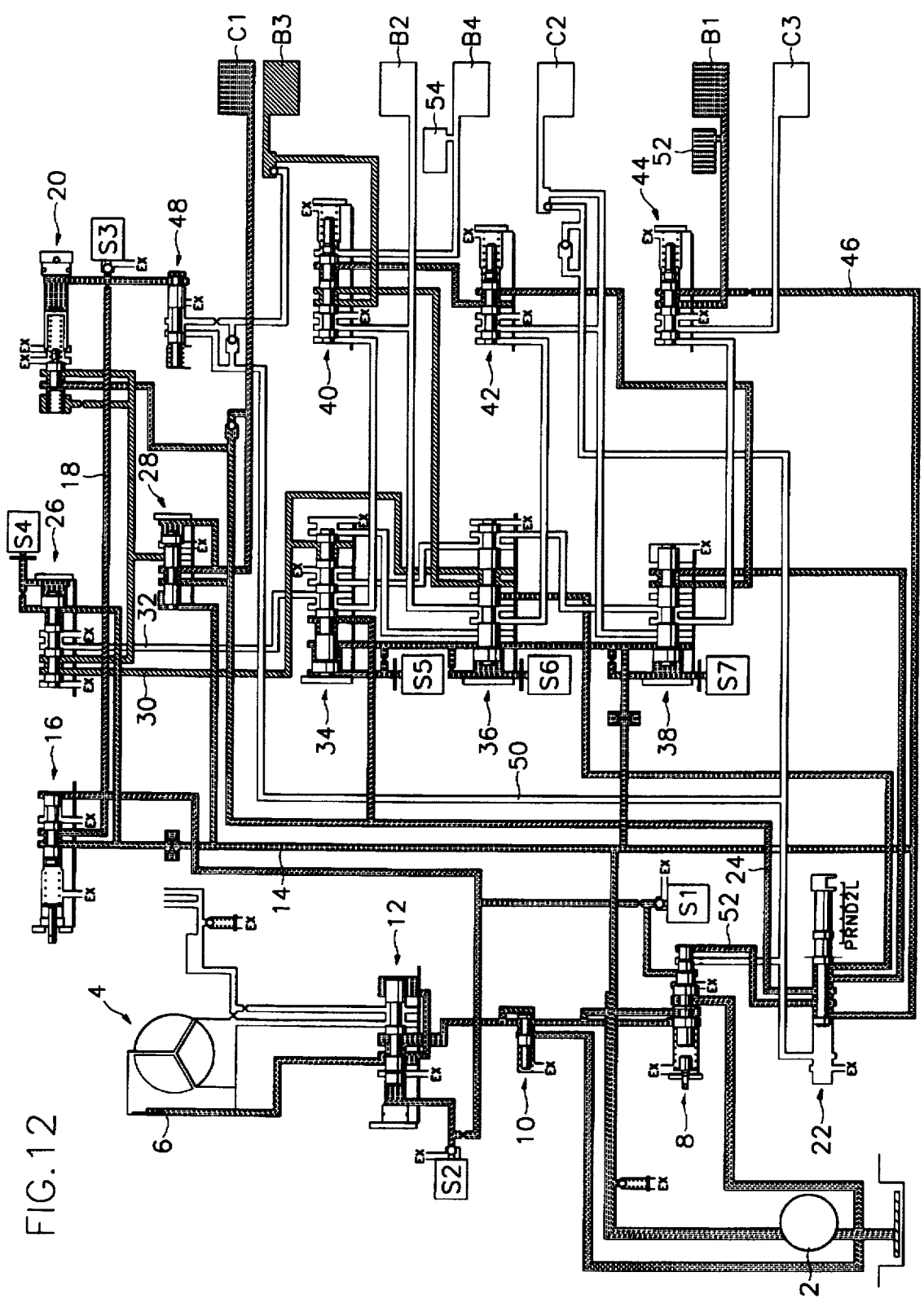
FIG. 12 is the hydraulic circuit diagram of FIG. 1 showing the operation of the control system when shifting from a third speed of the "D" range to a first speed of "L" range.

FIG. 12 shows the operation of the control system when manually shifting from the third speed of the "D" range, wherein the first, second, third and fourth friction members B1, C1, B2 and C2 are actuated, to the first speed of the "L" range, by operating the shift select lever.

As the manual valve 22 is shifted to the first speed of the "L" range, the third solenoid valve S3 is controlled to an ON state to release line pressure acting at the first port 116 of the torque control regulator valve 20. Then, drive pressure fed from the manual valve 22 is converted to torque pressure. This torque pressure is fed to the first port 134 of the control switching valve 26 via the second and third ports 118 and 120 and fed to the first torque pressure conduit 30 via the second port 136.

Because the fifth solenoid valve S5 is controlled from an OFF state, to an ON state and the valve spool of the 1-2 shift valve 34 is displaced towards the left, in the figure this torque pressure is fed to the first port 180 and the eighth port 226 of the 2-3 shift valve 36, as indicated by the hatched lines in the figure.

Also, because the valve spool of the 1-2 shift valve 34 is displaced towards the left in the figure, the third and fourth friction members B2 and C2, which have been actuated by drive pressure, are released.

Because the sixth solenoid valve S6 is controlled to an OFF state, torque pressure fed to the eighth port 226 of the 2-3 shift valve 36 is fed to actuate and control the sixth friction member B3, via the eighth port 226 and the seventh port 228, which are communicated with each other, and via the first clutch valve 40 as indicated by the hatched lines.

After a speed shifted to the first speed of the "L" range is performed, according to the sixth solenoid valve S6 controlled to an ON state, drive pressure fed from the manual valve 22 is fed to the six the friction member B3, which has been actuated by torque pressure, and compensates the same.

As broadly described, above and in accordance with the present invention, the torque pressure conduit, which branches off of the second torque pressure conduit of the N-D control valve and connects to the 3-4 shift valve, is eliminated, thus simplifying the construction of the 3-4 shift valve.

Also, the manual valve is eliminated, and the second accumulator is disposed in the pressure conduit of the seventh friction member reduces shift shock caused by drive pressure when manually shifting from the fourth speed of the "D" range to the "2" range.

Furthermore, a process of actuating the sixth friction member S6 by drive pressure, after controlling the same by torque pressure, when manually shifting from the third speed of the "D" range to the first speed of the "L" range, is introduced to improve smooth shifting when manually shifting.

What is claimed is:

1. A hydraulic control system of an automatic transmission, comprising:

a hydraulic pump for pressurizing a fluid;

a pressure regulating valve connected to the hydraulic pump for varying pressure according to a vehicle driving state;

a solenoid supply valve for feeding a line pressure fed from the pressure regulating valve via a line pressure conduit to first, second and third solenoid valves;

a manual valve operated by a shift select lever for feeding the pressurized fluid from the hydraulic pump to a drive pressure conduit at a "D" range and to a reverse pressure conduit at an "R" range;

a torque control regulator valve which receives a torque pressure from the manual valve to convert the torque pressure by the third solenoid valve controlled according to a duty ratio;

a control switching valve which receives the torque pressure from the torque control regulator valve to alternately feed the torque pressure to a first torque pressure conduit or a second torque pressure conduit by a fourth solenoid valve controlled to an ON/OFF state;

an N-D control valve for feeding the torque pressure, and subsequently a drive pressure, to a second friction member actuated together with a first friction member which is actuated by the line pressure at the beginning of a speed shift when changing from a neutral mode to a drive mode to prevent shift shock;

a 1-2 shift valve controlled by a fifth solenoid valve which is controlled to an ON/OFF state for feeding the torque pressure from the first and second torque pressure conduits, and the drive pressure from the manual valve, to a third friction member via a second clutch valve when shifting from a first speed to a second speed of the "D" range;

a 2-3 shift valve controlled by a sixth solenoid valve which is controlled to an ON/OFF state for feeding the torque pressure from the 1-2 shift valve and a portion of the fluid fed to the third friction member to a fourth friction member via a third clutch valve, and for feeding the drive pressure of an "L" range from the manual valve to a sixth friction member when shifting from the second speed to a third speed of the "D" range;

a 3-4 shift valve controlled by a seventh solenoid valve which is controlled to an ON/OFF state for feeding the torque pressure from the 2-3 shift valve, and a portion of the fluid fed to the fourth friction member to a fifth friction member via a fourth clutch valve, and obstructing pressure fed to the first friction member, and for feeding the drive pressure from the manual valve to a seventh friction member via the third and second clutch valves and when manually shifting from the second speed of the "D" range to a second speed of a "2" range; and an N-R control valve controlled by the third solenoid valve for feeding the pressurized fluid from the manual valve via the reverse pressure conduit to the sixth friction member.

2. A hydraulic control system as claimed in claim 1 wherein the 1-2 shift valve includes:

a valve body having a first port to which the torque pressure from the first torque pressure conduit is fed, a second port to which the torque pressure from the second torque pressure conduit is fed, a third port through which the torque pressure coming through the first port is fed to one of the ports of the 2-3 shift valve, and a fourth port through which the torque pressure coming through the second port is fed to another port of the 2-3 shift valve, a fifth port to which the line pressure is fed through the 2-3 shift valve connected to the line pressure conduit, a sixth port to which the line pressure is fed according to the fifth solenoid valve, a seventh port to which the drive pressure from the drive pressure conduit is fed, and an eighth port through which the drive pressure coming through the seventh port is fed to the second clutch valve; and a valve spool having a first land on both sides of which the line pressure coming through the fifth and sixth ports acts, a second land on which the line pressure coming through the seventh port acts, a third land which closes the connection between the seventh port and the eighth port, a fourth land which opens the connection between the seventh port and the eighth port, a fifth land on which the torque pressure coming through the first port acts, and a sixth port on which the torque pressure acts when the torque pressure is fed from the first port to the third port.

3. A hydraulic control system as claimed in claim 1 wherein the 2-3 shift valve includes:

a valve body having a first port connected to the third port of the 1-2 shift valve to receive a first torque pressure, a second port connected to the fourth port of the 1-2 shift valve to receive a second torque pressure, a third port to which the line pressure from the line pressure conduit is fed, a fourth port through which the line pressure from the third port is fed to the fifth and sixth ports of the 1-2 shift valve, a fifth port to which the line pressure coming through the fourth port and controlled by the sixth solenoid is fed, a sixth port to which the second torque pressure coming through the third friction member is fed, a seventh port connected to one of the ports of the second clutch valve, an eighth port directly connected to the first torque pressure conduit, a ninth port connected to the conduit to which the drive pressure is fed at the "L" range state, a tenth port through which the torque pressure coming through the sixth port is fed to the third clutch valve, and an eleventh port through which the torque pressure coming through the second port is fed to one of the ports of the 3-4 shift valve; and a valve spool having a first land on both sides of which the line pressure from the third port and the fifth port acts, a second land on which the torque pressure from the first port acts, a third land which selectively allows the sixth port to be connected to the tenth port, a fourth land which selectively allows the seventh port to be connected to the ninth port, and a fifth land which selectively allows the second port to be connected to the eleventh port.

4. A hydraulic control system as claimed in claim 1 wherein the 3-4 shift valve includes:

a valve body having a first port to which the torque pressure from the eleventh port of the 2-3 shift valve is fed, a second port to which the torque pressure fed to the fourth friction member is fed, a third port to which the line pressure from the line pressure conduit is fed, a fourth port to which the line pressure controlled by the seventh solenoid valve is fed, a fifth port through which the torque pressure coming through the first port is fed to the fifth friction member via the fourth clutch valve, a sixth port to which the drive pressure from the manual valve is fed at the "2" and "L" ranges, and a seventh port through which the drive pressure fed to the sixth port is fed to the seventh friction member via the third clutch valve and the second clutch valve; and a valve spool having a first land on both sides of which the line pressure coming through the third port and the fourth port acts, a second land on which the torque pressure coming through the second port acts, a third land which selectively allows the first port to be connected to the fifth port, and a fourth land which selectively allows the sixth port to be connected to the seventh port.

5. A hydraulic control system as claimed in claim 1 wherein the second clutch valve includes;

a valve body having a first port to which the drive pressure is fed from the 1-2 shift valve, a second port through which the drive pressure coming through the first port is fed to the third friction member and the 2-3 shift valve, a third port to which a pressure from the seventh port of the 2-3 shift valve is fed, a fourth port through which the pressure coming through the third port is fed to the sixth friction member, a fifth port connected to a port of the third clutch valve at the "2" and "L" ranges to receive the drive pressure, and a sixth port through which the drive pressure coming through the fifth port is fed to the seventh friction member; and a valve spool having a first land which selectively allows the first port to be connected to the second port, a second land which selectively allows the third port to be connected to the fourth port, a third land which separates the third port from the fifth port, and a fourth land which is biased by a spring and selectively allows the fifth port to be connected to the sixth port.

6. A hydraulic control system as claimed in claim 1 wherein the third clutch valve includes:

a valve body having a first port to which the torque pressure from the 2-3 shift valve if fed, a second port through which the torque pressure coming through the first port is fed to the fourth friction member and the 3-4 shift valve, a third port to which the drive pressure from the manual valve is fed via the seventh port of the 3-4 shift valve at the "2" and "L" ranges, and a fourth port through which the drive pressure coming through the third port is fed to the fifth port of the second clutch valve; and a valve spool having a first land which selectively allows the first port to be connected to the second port, a second land which selectively allows the third port to be connected to the fourth port, and a third land biased by a spring.

7. A hydraulic control system as claimed in claim 1 wherein the fourth clutch valve includes:

a valve body having a first port to which the torque pressure from the 3-4 shift valve 38 is fed, a second port through which the torque pressure coming through the first port is fed to the fifth friction member, a third port to which the line pressure from the line pressure conduit is fed, and a fourth port through which the line pressure coming through the third port is fed to the first friction member; and a valve spool having a first land which selectively allows the first port to be connected to the second port, a second land which selectively allows the third port to be connected to the fourth port, and a third land which is biased by a spring.

8. A hydraulic control system as claimed in claim 1 wherein a second accumulator for absorbing shift shock when pressure is fed during shifting from the fourth speed of the "D" range to the second speed of the "2" range is disposed in the pressure conduit of the seventh friction member.

9. A hydraulic control system as claimed in claim 1 wherein speed shifting is controlled initially by the torque pressure, and subsequently by the drive pressure, when shifting from the third speed of the "D" range to the first speed of the "L" range.

* * * * *